Figure 1:
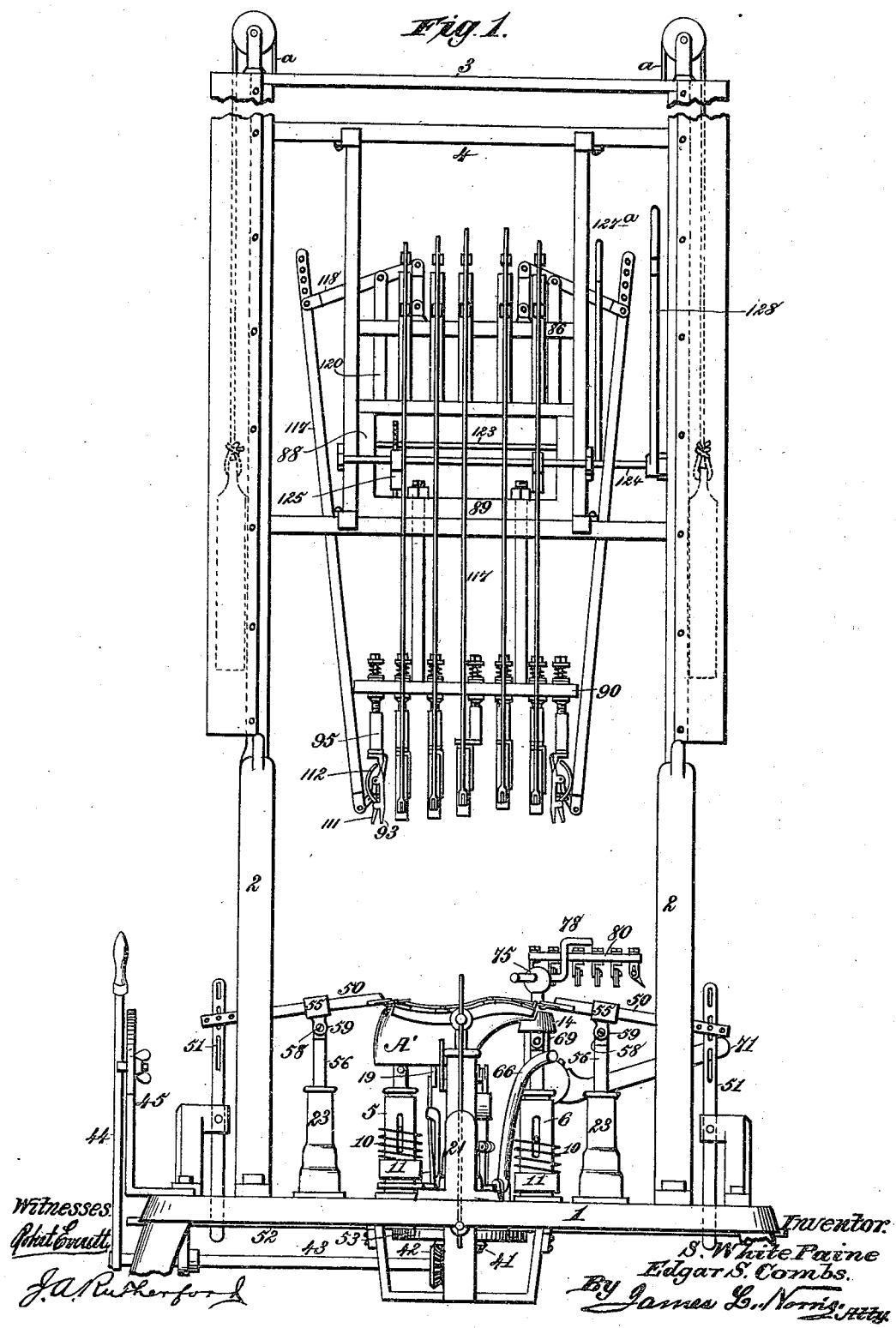

(No Model.)  6 Sheets—Sheet 1.

S. W. PAINE & E. S. COMBS.
LASTING MACHINE.

No. 355,785.  Patented Jan. 11, 1887.

(No Model.) 6 Sheets—Sheet 2.

S. W. PAINE & E. S. COMBS.
LASTING MACHINE.

No. 355,785. Patented Jan. 11, 1887.

Witnesses.
Robt Swett
J. A. Rutherford

Inventors.
S. White Paine.
Edgar S. Combs.
By James L. Norris,
Atty.

N. PETERS, Photo-Lithographer, Washington, D. C.

(No Model.) 6 Sheets—Sheet 3.

S. W. PAINE & E. S. COMBS.
LASTING MACHINE.

No. 355,785. Patented Jan. 11, 1887.

Witnesses.
Robert Errett,
J. A. Rutherford

Inventors.
S. White Paine,
Edgar S. Combs.
By James L. Norris.
Atty.

(No Model.) 6 Sheets—Sheet 4.
S. W. PAINE & E. S. COMBS.
LASTING MACHINE.
No. 355,785. Patented Jan. 11, 1887.
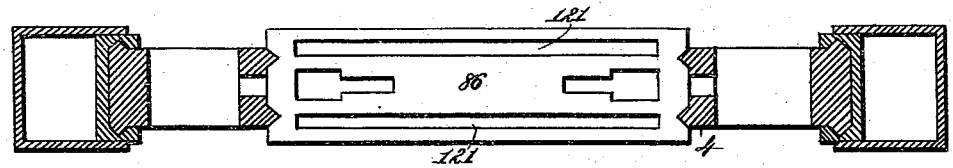
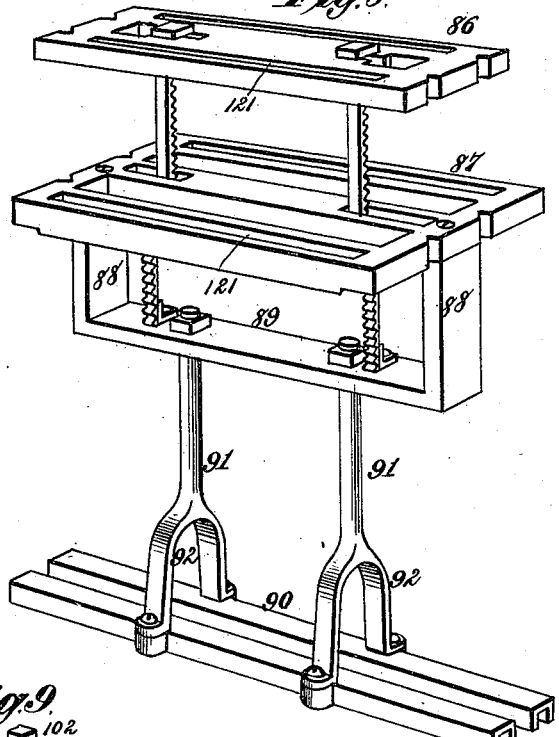
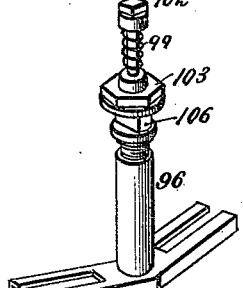
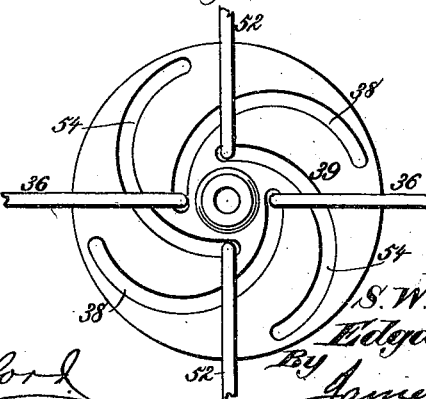
Witnesses.
Robert Everett
J. A. Rutherford
Inventors.
S. White Paine
Edgar S. Combs
By James L. Norris
Atty.

(No Model.) 6 Sheets—Sheet 5.
S. W. PAINE & E. S. COMBS.
LASTING MACHINE.
No. 355,785. Patented Jan. 11, 1887.
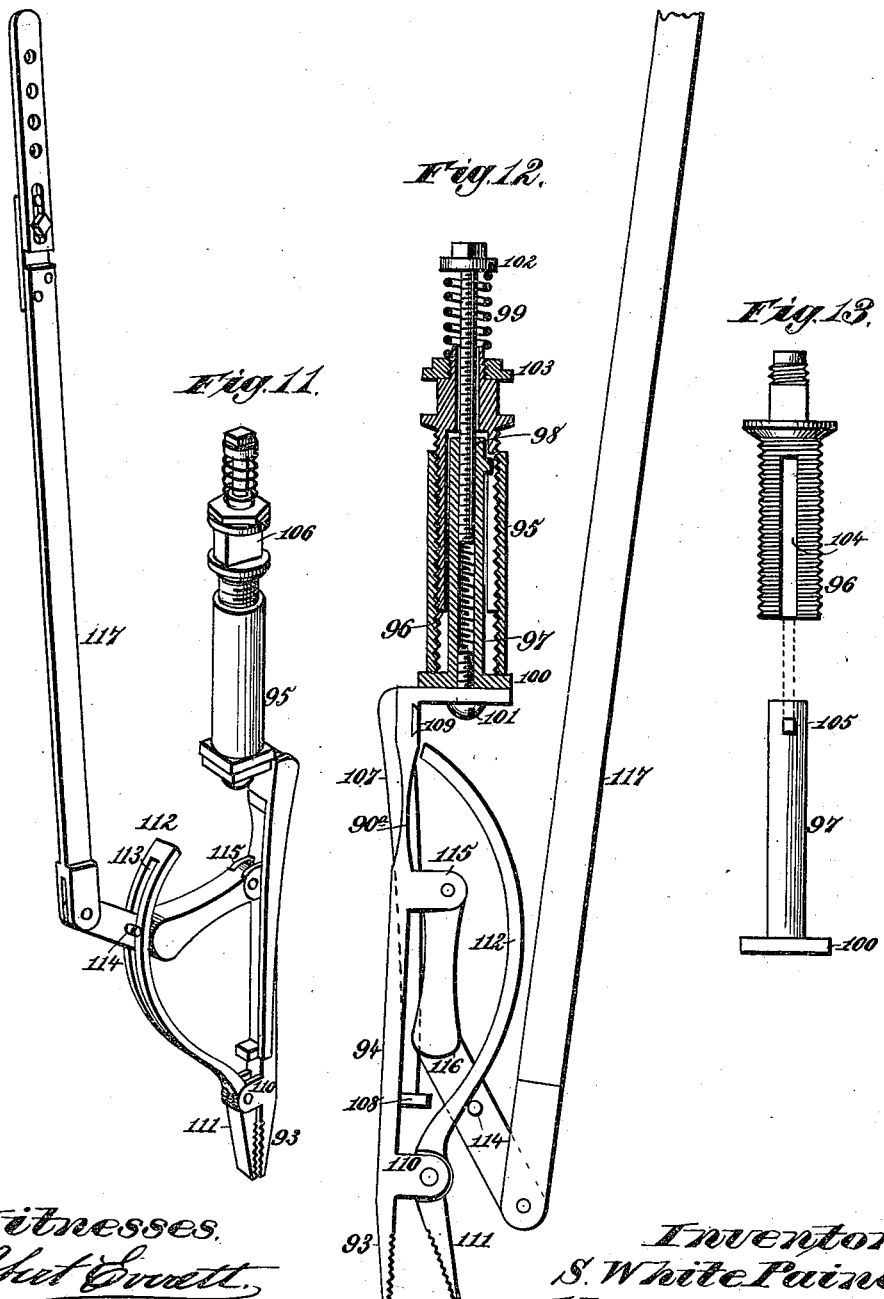

(No Model.) 6 Sheets—Sheet 6.
S. W. PAINE & E. S. COMBS.
LASTING MACHINE.
No. 355,785. Patented Jan. 11, 1887.
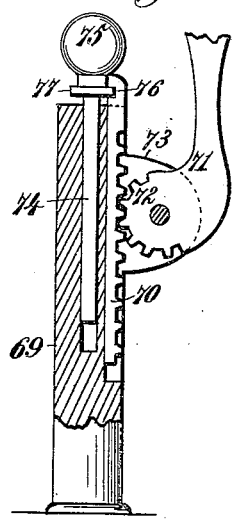
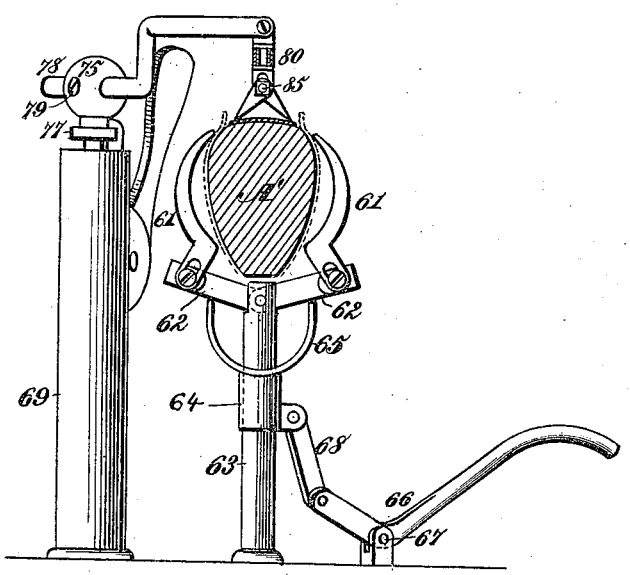
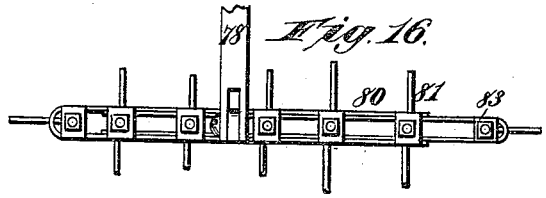
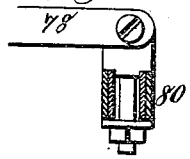
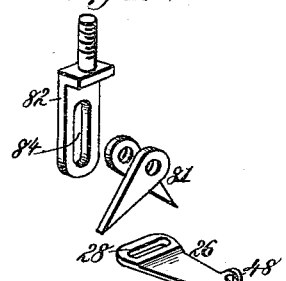
Witnesses.
Inventors,
S. White Paine
Edgar S. Combs
By James L. Norris
Atty.

UNITED STATES PATENT OFFICE.

S. WHITE PAINE AND EDGAR S. COMBS, OF ROCHESTER, NEW YORK; SAID COMBS ASSIGNOR TO SAID PAINE.

LASTING-MACHINE.

SPECIFICATION forming part of Letters Patent No. 355,785, dated January 11, 1887.

Application filed February 18, 1886. Renewed November 29, 1886. Serial No. 220,222. (No model.)

*To all whom it may concern:*

Be it known that we, S. WHITE PAINE and EDGAR S. COMBS, citizens of the United States, residing at Rochester, in the county of Monroe and State of New York, have invented new and useful Improvements in Lasting-Machines, of which the following is a specification.

The present invention relates to that class of machines for lasting boots and shoes in which overhanging pinchers are employed to hold the edges of the upper while it is being stretched over or drawn close upon the insole placed on the last by means of horizontally-sliding jaws operating at the sides and heel and toe portions of the last.

The invention consists in means for holding down the last against the upward pull of the gripping devices, said means being arranged beneath the last and serving to lock the latter to the post upon which it is supported; in devices for pressing the outer edges of the insole close to the last to allow the heel and toe and side lasting devices to pass over the insole without mistake; in the provision of lasting-jaws of a special construction and in mechanism for simultaneously operating the same or causing them to move toward and upon the last for stretching or drawing the upper over the insole, and withdrawing said stretching devices from the last to allow the latter to be removed; in self-adjusting supports for the last which will permit the same to yield sufficiently in a vertical direction to allow the stretching devices to move properly upon the last and accommodate themselves to the surface of the last or an irregularly-surfaced insole placed on the latter; in special means for bringing the upper in close contact with the last before the stretching devices commence their operation, so as to allow the pinchers to properly grasp the edges of said upper; in peculiar mechanism for supporting, raising and lowering, and closing and opening a series of pinchers that are grouped around the last; in pinchers of a peculiar construction that can be adjusted vertically and horizontally to adapt them for use with different-sized lasts, the pinchers having also a self-adjusting movement in lateral and vertical directions to cause them to conform to the contours of the last and the thickness and quality of the leather being operated upon, and, finally, in such other details of construction and arrangement as will be hereinafter more fully described, and then set forth in the claims.

Figure 2:
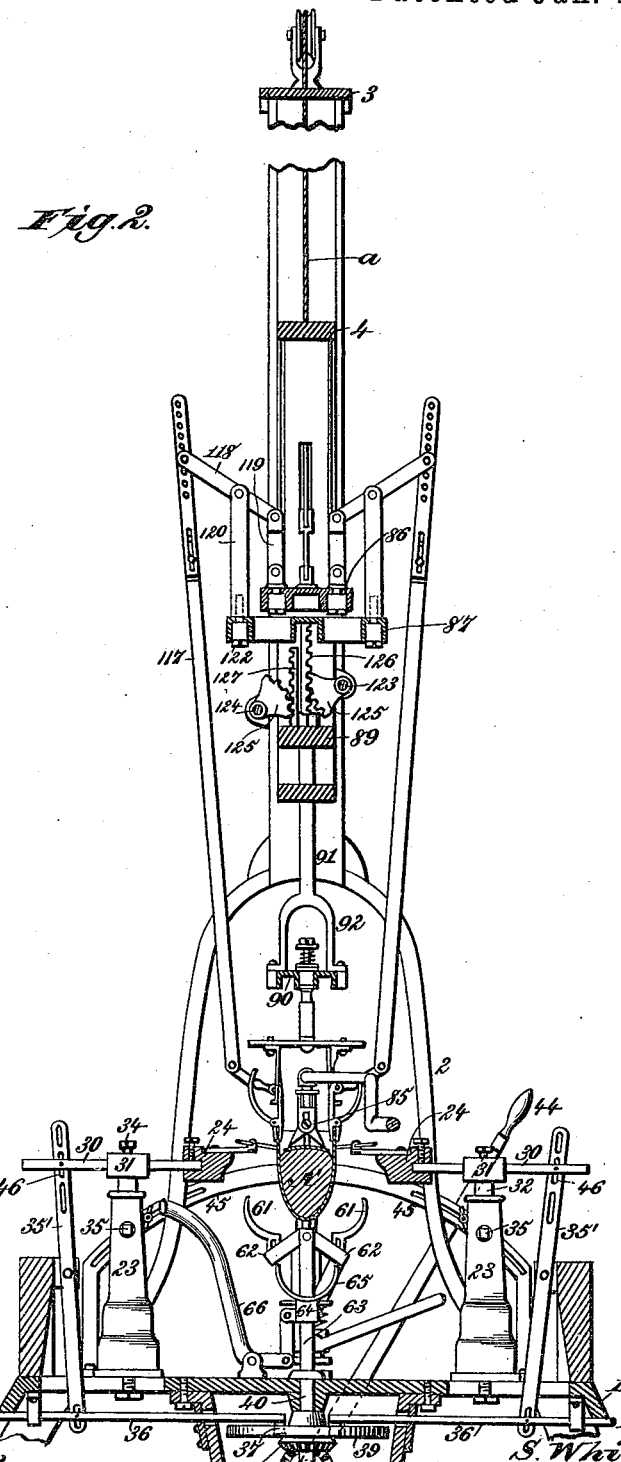
Figure 3:
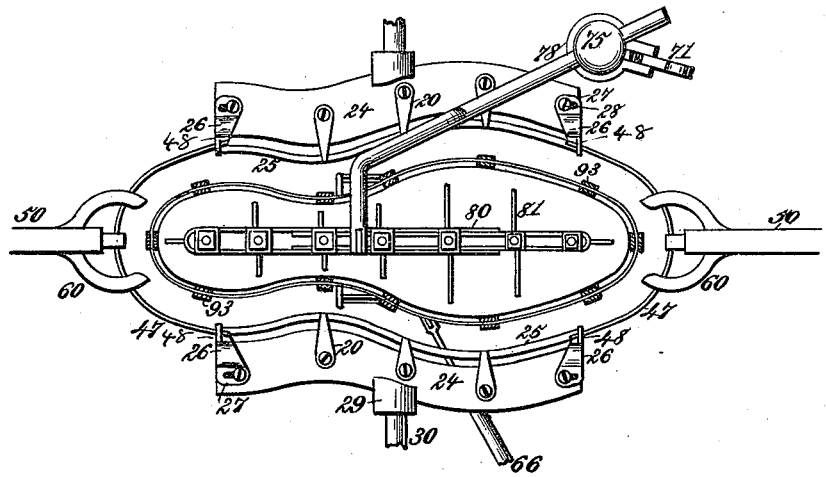
Figure 4:
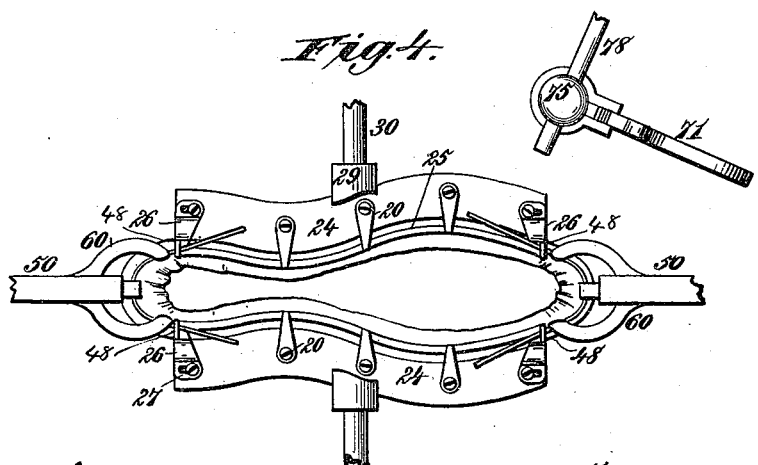
Figure 6:
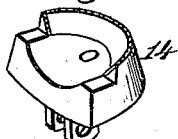
Figure 5:

In the drawings, Figure 1 is a side elevation of my lasting-machine, showing the pinchers and their carrying devices in an elevated position and the lasting devices moved upon the last to hold the upper while it is being tacked to the insole. Fig. 2 is a vertical section of the machine, showing the upper grasped by the pinchers and the edges of the insole held by a peculiar retaining device to allow the approaching lasting-jaws to glide over the insole. Fig. 3 is a plan or top view of the last, the insole-holding device, and the various jaws in position before commencing the stretching operation. Fig. 4 is a plan view showing the insole-holding device turned away from the last and the lasting-jaws moved upon the latter to press the edges of the upper upon the insole. Fig. 5 is a detail view of what may be termed a "heel" or "toe" stretcher. Fig. 6 is a detail view of the toe-support of the last. Fig. 7 is a transverse section showing the stationary frame of the machine and the sliding sash or frame fitted therein. Fig. 8 is a perspective view showing the construction of the frames that support or carry the pinchers and operating mechanism. Fig. 9 is a detail view of one of the pincher-holders adapted for use at the sides of the last. Fig. 10 is a face view of a wheel having scroll-slots for simultaneously operating the stretching-jaws at the sides and toe and heel portions of the last. Fig. 11 is a perspective view of one of the pinchers, showing its holder and part of its operating mechanism. Fig. 12 is a side elevation of one of the pinchers, its adjustable holder being shown in section. Fig. 13 is a detail view of part of the pincher-holder. Fig. 14 is an elevation, partly in section, of the insole-holding devices and the means for pushing the upper against the last. Fig. 15 is a detail view of part of the mechanism for raising and lowering the insole-holding device and swinging the same to and from the last. Figs. 16, 17, and 18 are detail views of the insole holding device or the means for pressing the edges of the insole upon the last. Fig. 19 is a detail view of a longitudinal steel strip applied to the side-lasting jaws. Fig. 20 is a sectional view of the column and adjustable supporting and locking devices for the last.

The numeral 1 designates the bed-plate of our machine, from which rise vertical standards or columns 2, that are connected at the top by a horizontal beam, 3. In the stationary frame formed by said standards and cross-beams is fitted a sliding sash or movable frame, 4, that carries a system of pinchers and their operating devices, as will be hereinafter fully explained. The bed-plate or table 1 supports on its upper surface two plates or short columns, 5 and 6, that are arranged in line with each other at a proper distance apart and serve as holders for the last A'. These columns are made hollow and have a closed bottom, into which passes a short screw-bolt, $7^a$, that extends through the table or bed-plate and serves to hold the columns in position upon said bed-plate. The bore of each of these columns 5 and 6 is made of unequal diameter, the upper portion receiving a tubular sleeve, 7, which encircles a stem, 8, that extends above said sleeve and has its lower end fitted into the smaller bore of the column. The stem 8 is provided with a horizontal pin, 9, which projects through vertical slots made in the column and the tubular sleeve 7 and rests upon the upper coil of a spiral or volute spring, 10, that encircles the column and rests upon an adjustable collar, 11, surrounding the base of said column. The lower portion of the latter is provided with an exterior screw-thread, and the collar 11, which is made cylindrical and of a suitable length, has an interior screw-thread, 13, formed at its lower end, the remaining portion of the base being threadless.

The object of the screw-threaded column and exterior screw-collar is to permit the spring to be adjusted vertically for increasing or diminishing its tension, so as to cause it to exert more or less pressure upon the stem 8. These stems—one in each column—carry or support the last A', one of the stems being entered into a socket at the rear of the last and the other receiving a block, 14, which is properly hollowed out or shaped to receive and support the toe portion of the last. The tubular sleeve 7 in each hollow column 5 and 6 is made vertically adjustable, and a set-screw, 15, passing through the column and bearing upon the sleeve serves to hold it in any position in which it may be set.

It will be evident that a last supported in the manner described can yield vertically in an automatic manner, so as to adapt itself to various conditions of work, and that the variable pressure of the spring is resorted to in order to allow the last to move up and down to a greater or less extent.

The adjustable sleeve and its set-screw are employed to set the stems 8 high or low or cause them to extend more or less above the columns 5 and 6 for use with different-sized lasts in connection with the same stretching devices or crimping-jaws. The column 5, which supports the heel portion of the last, bears beneath its encircling screw-collar a nut, 16, to which is attached a vertical spring bar or tongue, 17, the upper end of which terminates in a horizontal hook, 18. This hook engages with a staple-shaped projection, 19, secured to the top of the last, and serves to lock said last to the column 5, for the object hereinafter set forth. The lower end of the vertical spring-bar 17 has a vertical slot, $20^4$, through which passes a set-screw, $20^3$, that secures said spring-bar to the nut 16. The object of this slot-and-screw connection is to make the spring-bar vertically adjustable, to adapt it for use with lasts varying in height or thickness. In practice the last is slightly depressed, so as to cause the hook 18 to spring into the staple-shaped projection or slotted plate 19, depending from the inserted last. The slot in the projection 19 is sufficiently long to allow the last to have a sufficient vertical play without disengaging it from the spring-hook, and for this reason effectual provision is made for holding the last locked to the column 5 until such time as the upper has been drawn upwardly by the pinchers and the various stretching-jaws have moved upon the upper and the last. After this no further need exists for holding the last in a locked position against the upward pull of the gripping devices that serve to stretch the upper and hold it in position for proper presentation to the lasting devices. The nut 16 also carries a pivoted elbow-lever, 21, the longer arm of which is seized by the operator to bring a top projection or cam, 22, on the shorter arm against the vertical spring-tongue and release the hook thereof from the slotted projection on the last, when the latter can be removed from its supporting-column. Additional columns, 23, are arranged at the sides and ends of the last A', that is supported and held upon the columns 5 and 6 in the above-described manner, and upon said columns are mounted the devices for stretching the upper or forming the edges thereof upon the insole placed on the last. These stretching devices consist of the lateral jaws 24, that are each formed of a solid block of metal, and a longitudinal steel strip, 25, which latter part is the surface that comes in contact with the sides of the upper and crimps the same upon the insole. The inner side face of each jaw 24 is curved or shaped to conform to the sides of the last, so that it can be brought close against the last in the performance of the lasting operation. The steel strip 25 is scroll-shaped or curved, so as to follow the outline of the solid part of the crimping-jaws, and it is attached to horizontal end fingers or plates, 26, which project beyond the jaws and are attached thereto by screws 27. Slots 28 are made in these attaching-plates for the passage of the fastening-screws 27, so as to permit the strip 25 to have a limited movement in an outward direction from the jaw 24. The strip 25 is supported at points intermediate of the end attaching-plates by means of fingers or plates 20, which are secured to the jaw 24 and bear upon the upper face of the strip 25.

Each side-stretching jaw or device has a socket, 29, which receives a horizontal stem, 30, that passes through a sleeve, 31, on the upper part of a vertical stem, 32, fitted in the supporting-column 23. The stem 30 is held in the socket of the stretching-jaw by means of a set-screw, 34, and the vertical stem 32 is adjustably held in its column 23 by another set-screw, 35, as is clearly shown in Fig. 2. The stem 30 is free to slide through the sleeve 31 of the vertically-adjustable stem 32, and its outer end is connected with the upper end of a centrally-fulcrumed lever, 35', that passes through the bed-plate of the machine and is connected with a horizontal rod, 36, fitted in suitable bearings on the under side of said bed-plate. The rod 36 has a pin, 37, at its inner end, which fits into a scroll-shaped slot, 38, made in a horizontal disk, 39, mounted on an upright shaft, 40. This shaft has a bevel spur-wheel, 41, into which meshes a similar wheel, 42, on a horizontal shaft, 43, that extends beyond the bed-plate of the machine and carries a vertical lever-arm, 44. A curved slotted bar, 45, on the bed-plate of the machine may be resorted to for defining or limiting the movement of the lever-arm in either direction, screw-holes and nuts fitted in the slots of said bar 45 serving as adjustable stops for the object stated.

The disk 39 has four scroll-shaped slots, 38 and 54, two of which (marked 38) receive the pins 37 on the rods 36, connected with the lateral or side lasting devices, and it is thus apparent that when said slotted disk is turned through the medium of the hand lever and gearing that the lateral jaws are made to advance and recede from the last, according to the direction in which the lever is moved. The vertical stems of the lateral jaws being adjustably fitted in their supporting-columns, it is obvious that they must also be adjustably attached to the levers 35. This is effected by making a slot, 46, in each lever and fastening the horizontal sliding stem 30 by a suitable screw-bolt. The stretching devices located at the toe and heel portions of the same are the same, except as to width and size, and each may be described as curved or U-shaped spring-arms 47, the ends of which are passed through eyes 48 formed in the slotted plates or fingers 26, which bear the longitudinal metal strips 25 of the side lasting-jaws. The curved or bow portion of the device, 47, is passed through an eye-plate, 49, which projects from the inner end of a horizontally-sliding stem, 50. The outer end of this stem is adjustably connected with an upright lever, 51, having its lower end connected with a rod, 52, that slides in bearings beneath the bed-plate of the machine, and has a pin, 53, at its end, which fits into its respective scroll-slot 54 in the disk 39.

The spring-shaped stretching devices arranged at the heel and toe portions of the last have their sliding stems 50 fitted in sleeves 55, which are connected with stems 56, that are entered into sockets of vertical columns 23 rising from the bed-plate of the machine in proper relation to the last.

The sleeves 55 are jointed to the stems 56 by screw-bolts 58 and perforated ears 59, so as to allow the angle of the spring-stretchers to be varied for accommodating the same to the curvature or angle of the last used in the machine. These screw-bolts, however, are so fitted that the joint can be tightened to prevent the stretchers from rocking on their sleeves when they are at work.

In order to give the proper strength and rigidity to the spring toe and heel stretchers, I cause forked plates 60 to bear upon the same, said forked plates being attached to the stems that carry the spring-stretchers. As has already been stated, these spring-stretchers are connected with the side lasting devices, so that the latter will guide the movement thereof in the performance of their operation of forcing the upper upon the last or insole placed upon the last. The spring-stretchers (shown in detail in Fig. 5) engage with the upper in such a manner as to gradually and uniformly force the same inward upon the last at the heel and toe for properly lasting the edges of the upper upon the insole and placing it in proper position for being tacked or cemented to said insole.

By the use of a bow-shaped stretcher of spring metal I overcome the disadvantages of the solid or jointed block-stretchers heretofore employed, and am enabled to lay the upper upon the insole in an even or regular manner without incurring the liability of "puckering" or injuring the same.

For the purpose of pressing and holding the upper in close proximity to the last, or in such relation thereto that it can be seized by pinchers arranged above the last or overhanging the latter, I locate at the shank portion of the last vibrating arms or pressers 61, which are secured to angular brackets or toggle-arms 62, pivoted to a vertical post, 63, that is arranged on the bed-plate of the machine immediately beneath the last. This post 63 is encircled by a collar or sleeve, 64, which has its upper end provided with yokes or curved arms 65, that act upon the toggle-arms and force the presser arms or fingers 61 toward the last. This movement of the pressers and their operating devices is effected by means of an elbow-lever, 66, that is fulcrumed at the point 67 on the bed-plate of the machine, and is, by means of a link, 68, connected with the vertically-sliding sleeve 64 on the post 63. By depressing said lever, the sleeve and its yoke or arms are moved in an upward direction, and the fingers 61 are caused to press the leather of the upper against the shank portion of the last, for the object already stated. When the sleeve is released the weight of the various parts causes them to return to their normal positions, and the presser-fingers 61 in particular are swung away in an outward direction from the last.

The presser-fingers are provided with slotted shanks for adjustably attaching the same to the toggle-arms by suitable clamping-screws, this provision being made to allow the fingers to be adjusted to suit different-sized lasts. In practice the upper is forced against the last by the presser-fingers, and then after the pinchers have grasped the upper the presser-fingers are swung out of the way of the approaching side pressing-jaws. The insole placed upon the last has its outer edge brought in close contact therewith, in order to insure the movement of the lasting-jaws upon said insole, or, in other words, permitting the upper to be always crimped down upon the insole by the action of the different jaws. This insole holding or pressing mechanism may be described as follows, viz: At a point of the bed-plate outside the part occupied by the last is arranged a column, 69, which has a vertical groove in which is seated a vertically-reciprocating rack-bar, 70, that is operated by a lever, 71, having a toothed segmental head, 72, gearing into the rack-bar. This lever is fulcrumed between horizontal cheeks or plates 73, projecting from the standard, as is clearly shown in Fig. 15. The standard has a vertical bore or socket which receives a stem, 74, that is surmounted by a head, 75, said stem being free to rotate in the bore in the standard. The upper end of the rack-bar 70 has a notch, 76, on its inner smooth face which receives a horizontal circular flange or collar, 77, formed on the rotating stem 74. The object of this form of connection is to permit the stem and its attached parts to be raised and lowered by the rack-bar and to allow it to rotate in the standard without affecting said rack-bar.

The head 75 on the rotating and sliding stem 74 has a horizontal opening, through which is passed a bent obliquely-extending arm, 78, that is held in said head by a set-screw, 79. This arm, when swung in an inward direction, overhangs the last and carries a longitudinal slotted bar or frame, 80, which receives a series of diverging fingers, 81, that bear upon the insole near its inner edge and hold the edge portion of the insole down upon the last to permit the lasting-jaws to properly crimp or fold the edges of the upper upon said insole. The aforesaid fingers 81 are attached to the bar 80 by means of carriers 82, which may also be termed "plates," having screw-shanks that pass through the slot in the bar and are held in place by nuts 83 applied to their upper ends. By loosening said nuts the carriers 82, with their attached fingers or insole-pressers, can be adjusted in a longitudinal direction to adapt the same for use with lasts of different lengths.

The carriers 82 are each provided with a vertical slot, 84, through which passes the screw-bolt 85, that serves to secure the fingers thereto. The object of this connection is to allow the insole-pressers to be spread more or less or adjusted vertically to adapt them for use with lasts or insoles varying in thickness, as will readily be apparent. The bar 80 has a lug on its top, which is entered in the bifurcated end of the arm 78, and is secured thereto by a screw-bolt.

It will be evident from the above description that the insole-pressing device can be swung over the last and lowered upon the insole to allow the lasting-jaws to fold the upper upon the insole. When not in use the insole-pressing device can be swung away from the last by virtue of the swiveled supporting-stem, as will readily be seen from Figs. 1 and 4 of the drawings.

The mechanism for grasping the edges of the upper and holding the same in position for presentation to the stretching devices or jaws is carried by the sliding sash or frame 4, that is fitted to slide between the standards 2 and has uprights and cords $a$ connected therewith for facilitating the raising thereof. The sash or frame 4 contains an inner frame or supporting devices for a series of pinchers and their operating mechanism, said inner frame being made in sections and so contrived that the various movements of the pinchers are performed by moving the members of said frame toward or from each other, as will be hereinafter explained.

Referring to Fig. 8 it will be seen that the inner frame, which carries the pinchers and operating devices, is composed of the upper bar or frame, 86, and the lower section or frame consisting of the frame 87, and the pendent arms 88, connected by the bar 89, from which is suspended a pair of rails, 90, that receive the holders of the pinchers, vertical stems 91, having bottom forks or bifurcations, 92, being employed for connecting the rails 90 with the bar 89. The frames 86 and 87 are provided with grooves in their edges which fit in projections or vertical ribs on the sash or frame 4, so as to allow a vertical movement of said frames to the space within the aforesaid sash or frame. The object of said frames 86 and 87 is to support a system of levers and their fulcrum-posts that are employed for opening and closing a series of pinchers mounted on the rails 90, and it may be stated in the present connection that the upper frame can be brought to be in contact with the frame 87, as is shown in Fig. 2, or moved away therefrom, as indicated in Figs. 1 and 8. The pinchers, carried by what may be termed a "sectional supporting-frame," are grouped around the last arranged thereunder and are designed to be lowered by means of the sliding sash or frame 4, whereupon a proper adjustment or movement of the frames or carrying-frame proper will cause said pinchers to perform their respective operations in the order and manner hereinafter stated.

The pinchers are present in suitable numbers so as to properly seize and hold the edges of the upper while it is being stretched to crimp or lay the same upon the insole, and a description of one will answer for all, except that some variation exists in the arrangement thereof or angles at which they are presented to the last, this obviously being necessary in order to bring the pinchers in proper relation to the different portions of the last.

Referring to Figs. 11 and 12, in which the pinchers are clearly illustrated on a large scale, it will be seen that a stationary jaw, 93, having a vertical shank, 94, is connected by means of the latter with a holder consisting of an outer shell, 95, or cylindrical nut, an inner shell, 96, a vertical hollow post, 97, a screw-stem, 98, and a spiral spring, 99, encircling the latter. The hollow post 97 has a base flange, 100, (seen clearly in Fig. 13,) which rests upon a right-angular extension of the top of the shank 94 and is secured thereto by means of a screw, 101, passed through said extension or rest into the lower end of the post 97, as is seen in Fig. 12. The post 97 is threaded internally or has a screw-socket which receives the screw-stem 98, the upper end whereof extends through the hollow shell 96 and is surmounted by a head, 102, between which and a nut or collar, 103, applied to an upper screw-threaded neck of the shell 96, is arranged the aforesaid spiral spring 99. The portion of the shell 96 which is encircled by the shell or nut 95 is screw-threaded and has a vertical slot, 104, that receives a lug or projection, 105, on the hollow post 97. A square or angular portion, 106, formed on the upper end of the shell 96 is designed to be inserted in the space between the rails 90 and a flange, 106, on said shell, and the nut 103 at its upper end rest, respectively, on the bottom and top surfaces of said rails and furnish a proper support for said shell. The shank 94 of the stationary jaw 93 has a spring or elastic portion, 90ª, which connects the lower or thicker portion with the right-angled top portion, as is clearly seen in Fig. 12. The object of this spring-shank will be explained farther on; but in the present connection it should be observed that the proper degree of strength is given to the spring-shank and its movement prevented in an outward direction from the last by means of a brace or supporting-arm, 107, which lies on one of the side edges of the shank and has a bottom extension, 108, that rests against the inner side of the shank. The upper end of said brace or supporting-arm also has a horizontal projection, 109, which is fitted into a corresponding groove in the inner face of the shank of the stationary jaw. At a suitable distance above the gripping portion of the stationary jaw 93 are formed eyes or plates 110, between which is pivoted the movable jaw 111, that is extended to form a segmental or curved arm, 112, having a slot, 113, made therein that extends from near the fulcrum-point to near the upper end of the arm. This slot 113 receives the outer portion of a bent or angular lever, 114, the inner end of which is fulcrumed in slots or lugs 115 projecting from the inner side of the stationary jaw of the pinchers. The portion of the lever 114 disposed between the curved arm 112 and the shank of the movable jaw is made thicker or heavier than the portion which operates in the slot of the curved arm, and has cam or eccentric surfaces 116 formed at its sides at the point or bend where said heavier portion joins the thinner portion. The object of these cam-surfaces is to act upon the inner surface of the curved arm, and through the intervention of the latter force or close the movable jaw upon the leather or other object held between the latter. The curved arm is so shaped that the cam-projections of the lever are in their operation of closing the movable jaw made to travel on a surface that is part of a true circle, and the curved arm possesses a sufficient degree of elasticity to permit pieces of leather of different thicknesses to be grasped between the same in a most positive and certain manner.

It is obvious that when a thin piece of leather is grasped by the jaw the curved arm will not spring or move to any perceptible degree, but when a thicker piece is grasped the most forcible pressure or movement of the cam-projections of the closing lever upon the curved arm will cause the latter to spring sufficiently to hold the leather with a firm grip.

To the outer end of the closing lever is jointed an upright rod or arm, 117, the upper end of which is connected with a lever, 118, that is fulcrumed in posts 119 and 120, rising, respectively, from the frames 86 and 87. Each pair of pinchers has such an upright rod or arm, 117, for connecting it with its respective lever 118, and all the fulcrum-posts of said levers are fitted in slots 121 made in the frames 86 and 87. The fulcrum-posts are held in said slots by means of clamping-nuts 122, fitted on bottom screw-shanks of said posts; and the object of this manner of fitting the posts and the levers carried by the same is to permit them to be shifted in a longitudinal direction for accommodating the pinchers to lasts of different lengths.

It is obvious that the holders of the pinchers can be adjusted along the rails 90, so as to conform to the position of said fulcrum-posts and levers, this adjustment of the pincher-holders being permitted by the square or angular portion of the shell 96 and its end nut.

The slots in the frames 86 and 87 are arranged at each side and at the ends thereof, so as to receive the fulcrum-posts and levers belonging to the pinchers operating at the sides and toe and heel portions of the last. The upper frame has its and slots provided with enlarged portions, which allow the end posts of the frame 87 to pass through the same when the two frames are brought together and the pinchers have been made to close upon the upper.

The mechanism for operating the two frames 86 and 87 consists of the transverse shafts 123 and 124, which carry segmental spur disks or gears 125, that mesh into vertical rack-arms 126 and 127, attached, respectively, to the upper frame and to the cross-arm beneath the frame 87. These shafts 123 and 124 are journaled in bearings of the sliding sash or frame 4 in front and rear of the latter, and have end levers, 127ᵃ and 128, which are both located at the same side of the machine, so as to be within convenient reach of the operator.

In order to cause the pinchers to seize the edges of the upper fitted on the last, the frame 4 is lowered and then the lever 127 is manipulated so as to cause the shaft 123 and its segmental gears to engage with the rack-arms 126 and effect the lowering of the upper frame. In this manner the fulcrum posts and levers carried by said frame will cause a vertical movement of the connecting-rods extending from the closing levers of the pinchers, and in consequence thereof the jaws of the latter are closed upon the edges of the upper. After this the other lever, 128, is manipulated for effecting the raising of the two frames, and it thus follows that the edges of the upper are brought above the surface of the last to properly present the same to the stretching jaws or devices that are now beginning to operate upon the upper for crimping or laying its edges upon the insole ready for subsequent tacking. After the pinchers have performed their work, the lever of the upper frame is again moved so as to raise said frame and cause the levers carried by the same and their connecting-rods to open the jaws of the pinchers. This having been done, the sash or frame which carries the gripping mechanism, that is arranged above the last and concerned in pulling and holding the upper before being seized by the stretching jaws, is raised to such a height as will allow proper access to be had to the last and the surrounding devices.

It should be observed that the object of the spring-shank of the pinchers is to allow the same to move sufficiently inward toward the last to accommodate themselves to the contour or surface thereof, it being obvious that the pull which the pinchers exert is not in a straight vertical line, but in a slightly inward and vertical direction.

In the performance of the lasting operation it may frequently happen that one or more of the series of pinchers may meet with resistance in stretching or drawing the leather upward, this being due to varying conditions or thicknesses of leather, and for overcoming such resistance I have provided the self-adjusting or yielding holders for the pinchers that will give or yield when portions of the leather difficult to pull are encountered and return to their normal positions as soon as the operation of all pinchers again becomes uniform.

Returning to the description of the pincher-holders, it will be seen that the spiral spring which encircles the screw-stem thereof will permit the aforesaid self-adjustment to adapt the pinchers to varying conditions of work. A positive adjustment of the pinchers for setting the same higher or lower in relation to their supporting-rails is effected by turning said spring-encircled screw-stem in the screw-socket of the hollow post carried by the shank of the pinchers, and when properly adjusted the outer shell or long cylindrical nut is properly set so as to leave no space between the base-flange of the hollow post and said tubular nut.

We do not claim herein what is claimed in our application for Letters Patent Serial No. 220,223, filed November 29, 1886.

What we claim is—

1. In a lasting-machine, the combination of a last-support, a latch mounted on said post, and a last having a catch or slotted projection on its upper side adapted to engage with said latch with heel and toe and side lasting jaws and a group of overhanging pinchers whereby the last is held against the upward pull of pinchers solely by the latch device arranged beneath the last, substantially as described.

2. In a lasting-machine, the combination of the last-holding device comprising a supporting column, a spring-hook, disengaging-lever, and last having a staple-shaped projection or slotted plate, with the heel, toe, and side crimping jaws and a group of overhanging pinchers, substantially as described.

3. In a lasting-machine, the combination of an independent insole-pressing device comprising a longitudinal bar and a group of inclined pressers or fingers diverging from said bar and adapted to bear upon the insole near its edges at the sides and rear thereof, with means for supporting said insole-pressing device and heel and toe and side lasting jaws, substantially as described.

4. In a lasting-machine, the combination of the longitudinal slotted bar having adjustable diverging fingers or oblique presser-feet, the laterally-swinging arm, and the swiveled and vertically-sliding standard with the last and the side and toe and heel lasting jaws, substantially as described.

5. In a lasting-machine, the combination of the column, the vertically-reciprocating bar having a notched upper end, the swiveled post or stem having a collar and end head, the arm fitted in said head, and the bar provided with insole-presser feet or fingers connected with the arm of the swiveled post with the last and the toe and heel and side lasting devices, substantially as described.

6. In a lasting-machine, the combination of the slotted longitudinal bar, the slotted carriers or shanks fitted in the same, and the fingers or presser-feet adjustably secured to said carriers with means for supporting said slotted bar and parts carried thereby and the last and toe and heel and side lasting devices, substantially as described.

7. In a lasting-machine, the combination of independent toe and heel lasting devices consisting each of a curved or bow-shaped spring, carriers for giving said springs a positive sliding movement, and side lasting-jaws having eyes for the passage of the free ends of the springs in order to contract the latter by the movement of the side lasting-jaws, substantially as described.

8. In a lasting-machine, the combination of the heel or toe lasting or stretching device, consisting of a bow or U shaped spring having its side arms adapted to engage with the upper and a bow-shaped plate resting upon the bow portion of said stretching device, with means for operating the latter and the independent sliding jaws or side lasting devices, substantially as described.

9. In a lasting-machine, the combination of the side lasting device, comprising a solid block or jaw, and the longitudinal strip attached to fingers extending beyond the edge of said block or jaw, with a last and toe and heel lasting devices, substantially as described.

10. In a lasting-machine, the combination of the vertical rock-shaft 40 and the plate 37 with scroll or curved slots or grooves mounted on said shaft, the horizontal sliding rods 36, engaging with the slots or grooves in said plate, the vertical levers 35', connected with said sliding rods, and the horizontally-sliding stretching-jaws connected with the vertical levers, substantially as described.

11. In a lasting-machine, the combination of the vibrating lever 44, the bevel spur-wheels 41 42, the vertical rocking-shaft 40, bearing a plate, 37, provided with scroll slots or grooves, the horizontal rods 36, engaging in said grooves or slots, the vertical levers 35', and the sliding stretching jaws or devices arranged at the sides and ends of a last and operated simultaneously by the described mechanism, substantially as described.

12. In a lasting-machine, the combination of the slotted hollow columns having exterior screw-threads cut thereon, the last-supporting stems fitted in said columns, the spiral springs encircling the latter and bearing upon the last-stems, and the adjustable screw-collars encircling the column beneath the springs with toe and heel and side lasting devices, substantially as described.

13. In a lasting-machine, the combination of the hollow last-supporting column, the adjustable sleeve fitted therein, means for holding said sleeve, a vertically-movable stem passing through the sleeve and entering the column, and an outer spring and regulating-nut, substantially as described.

14. In a lasting-machine, the combination of the curved swinging presser-arms conforming to the shank portion of a last, the toggle-levers carrying said presser-arms, and devices and means, substantially as set forth, for stretching the upper, substantially as described.

15. In a lasting-machine, the combination of the supporting-column, the sliding sleeve encircling the latter and having end arms, the hand-lever acting upon said sleeve, the toggle-levers pivoted to the supporting-columns, and the curved swinging presser-arms connected with the toggle-levers with a last, its supporting devices, and the heel and toe and side lasting jaws, substantially as described.

16. In a lasting-machine, the combination of a vertically-sliding sash or frame, the sectional frame fitted in said sash, and a group of pinchers and their operating devices carried by said sectional frame and adapted to be operated and closed and raised and lowered by the movement of said frame, substantially as described.

17. In a lasting-machine, the combination of the series of overhanging pinchers, the movable upper and lower frames carrying the longitudinally-adjustable fulcrum-posts, the levers mounted thereon, the vertical connecting-rods for operating the pincher-jaws, and the rails or bars for adjustably supporting the shanks or holders of the pinchers, substantially as described.

18. In a lasting-machine, the combination of the horizontal shafts having levers and segmental spurs, and the parallel or upper and lower frames having vertical rack-arms, and the series of pinchers and their operating devices mounted on said upper and lower frames, substantially as described.

19. In a lasting-machine, pinchers consisting of a spring-shank having a fixed jaw, the movable jaw pivoted to said shank, and a brace or support attached to the top of said spring-shank and bearing upon the latter near the fixed jaw to permit said spring-shank to have a movement only in a direction from said support, substantially as described.

20. In a lasting-machine, pinchers provided with a movable jaw having a curved elastic arm, the stationary jaw, and a device interposed between the curved arm and the shank of the stationary jaw for closing the jaws and allowing different thicknesses of material to be clamped between the same, substantially as described.

21. In a lasting-machine, pinchers provided with a closing lever having cam surfaces or projections with the shank of the stationary jaw and the movable jaw having a curved elastic arm for the passage of said closing lever and against which the cam-surfaces act, substantially as described.

22. In a lasting-machine, pinchers provided with a holder consisting of a hollow internally-threaded post having a lug, a spring-encircled stem fitted in said post, and a shell surrounding said post and having a vertical slot and a square or angular top portion, substantially as described.

23. In a lasting-machine, the combination of the long nut or shell with the externally-threaded shell or holder, the hollow post bearing the pinchers, and the spring-encircled screw-stem entering said post, substantially as described.

In testimony whereof we affix our signatures in presence of two witnesses.

S. WHITE PAINE.
E. S. COMBS.

Witnesses:
ERASTUS DARROW,
S. C. GAINARD.